United States Patent
Sehrawat et al.

(10) Patent No.: US 11,362,816 B2
(45) Date of Patent: Jun. 14, 2022

(54) LAYERED SECRET SHARING WITH FLEXIBLE ACCESS STRUCTURES

(71) Applicant: Seagate Technology LLC, Fremont, CA (US)

(72) Inventors: Vipin Singh Sehrawat, Shugart (SG); Foo Yee Yeo, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/018,991

(22) Filed: Sep. 11, 2020

(65) Prior Publication Data

US 2022/0085979 A1    Mar. 17, 2022

(51) Int. Cl.
H04L 29/06 (2006.01)
H04L 9/08 (2006.01)
H04L 9/32 (2006.01)

(52) U.S. Cl.
CPC ............ H04L 9/085 (2013.01); H04L 9/32 (2013.01)

(58) Field of Classification Search
CPC ..... H04L 9/085; H04L 9/3218; H04L 9/3026; H04L 9/088
See application file for complete search history.

(56) References Cited

U.S. PATENT DOCUMENTS

| | | | |
|---|---|---|---|
| 5,764,767 A * | 6/1998 | Beimel | H04L 9/085 380/286 |
| 7,389,416 B2 | 6/2008 | Cachin et al. | |
| 8,549,290 B2 | 10/2013 | Nishimaki et al. | |
| 8,995,660 B2 | 3/2015 | Kobayashi et al. | |
| 9,077,539 B2 | 7/2015 | Kamara et al. | |

(Continued)

FOREIGN PATENT DOCUMENTS

| CN | 110266489 A | * | 9/2019 |
|---|---|---|---|
| CN | 111339549 A | * | 6/2020 |

(Continued)

OTHER PUBLICATIONS

Li et al., "TMACS: A Robust and Verifiable Threshold Multi-Authority Access Control System in Public Cloud Storage", IEEE Transactions on Parallel and Distributed Systems, vol. 27, Issue: 5, May 1 (Year: 2015).*

(Continued)

*Primary Examiner* — Morshed Mehedi
(74) *Attorney, Agent, or Firm* — Holzer Patel Drennan

(57) ABSTRACT

A layered secret sharing scheme in which a trust set of each of the parties receiving a share of the secret is received and used to generate an authorized set and an adversary set for reconstruction of a secret. In this regard, an access structure defining an authorized subset of participants may be based, at least in part, on the encoded trust subsets of the shares. The secret sharing scheme includes a secret generator that generates the shares distributed to the parties. In turn, an authorized subset of participants as defined by the access structure may provide shares to a dealer for reconstruction of the secret. However, if the participants requesting secret reconstruction are not an authorized subset of participants or if participants define an adversary subset, the secret reconstruction fails. In this regard, even if an authorized subset is present, if an adversary subset is present, the reconstruction may be "killed."

20 Claims, 6 Drawing Sheets

(56) References Cited

U.S. PATENT DOCUMENTS

| | | | |
|---|---|---|---|
| 9,331,984 B2 | 5/2016 | Matsuo | |
| 10,728,038 B2* | 7/2020 | Tomlinson | H04L 63/0442 |
| 2010/0215172 A1* | 8/2010 | Schneider | H04L 9/085 |
| | | | 380/28 |
| 2012/0002811 A1 | 1/2012 | Smart | |
| 2018/0097624 A1 | 4/2018 | Bellare et al. | |
| 2018/0373834 A1* | 12/2018 | Cho | G16B 30/00 |

FOREIGN PATENT DOCUMENTS

| | | | | |
|---|---|---|---|---|
| WO | WO-9925090 A1 * | 5/1999 | | G06F 21/6209 |
| WO | WO-2015016828 A1 * | 2/2015 | | H04L 9/0838 |

OTHER PUBLICATIONS

Damgard, Ivan et al. "Secure Protocols with Asymmetric Trust" —Asiacrypt 2007, pp. 357-375.

Zhi, D.L. et al. "A Hybrid Quantum Secret Sharing Scheme based on Mutually Unbiased Bases" —Shaanxi Normal University, Shaanxi China, Jun. 23, 2020.

Eriguchi, Reo et al. "d-Multiplicative Secret Sharing for Multipartite Adversary Structures" —1st Conference on Information-Theoretic Cryptography (ITC 2020).

Shamir, Adi, "How to Share a Secret", Communications of the ACM 22 (1979), pp. 612-613.

Blakley, G.R., "Safeguarding cryptographic keys", American Federation of Information Processing. vol. 48. 1979, pp. 313-317.

Harn, L. et al., "Asynchronous Secret Reconstruction and Its Application to the Threshold Cryptography", Int. J. Communications, Network and System Sciences, 2014, 7, 22-29.

Cho et al., "Secure genome-wide association analysis using multi-party computation", Nature Biotechnology May 2018, pp. 547-553.

Huhns, Michael, et al., "Service-oriented computing: key concepts and principles", IEEE Internet Computing, Jan.-Feb. 2005, 75-81.

* cited by examiner

LAYERED SECRET SHARING WITH FLEXIBLE ACCESS STRUCTURES

SUMMARY

The present disclosure relates to a layered secret sharing scheme in which trust structures (e.g., asymmetric trust structures) are used to determine an authorized subset of participants and an adversary subset of participants for a secret reconstruction. A share of the secret may be distributed to a plurality of computing devices. The secret is not reconstructable with less than all of the shares of the secret from an authorized subset of participants that comprise a subset of the plurality of computing devices. A request to reconstruct the secret may include the shares from a participating subset of the computing devices. Each of the plurality of shares from the participating subset of the computing devices comprises an encoded trust structure. In turn, an authorized set of participants required to participate in the request for reconstruction of the secret is defined. The authorized subset is based on the encoded trust structure of the shares of the participating subset of the computing devices. Also, an adversary subset of participants that will preclude reconstruction of the secret is defined, which may be referred to as a "kill structure." The adversary subset is also based on the encoded trust structure of the shares of the participating subset of the computing devices. In turn, when attempting to reconstruct a secret, it is determined whether the participating subset of computing devices comprises a superset of the authorized subset of participants and whether the participating subset of computing devices contains the adversary subset. The secret is reconstructed using the plurality of shares if the participating subset of the computing contains the authorized subset and the participating subset of computing devices does not contain the adversary subset. However, even if an authorized subset is present, the reconstruction may be "killed" (i.e., caused to fail) if the adversary subset is present.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTIONS

Figure 1:
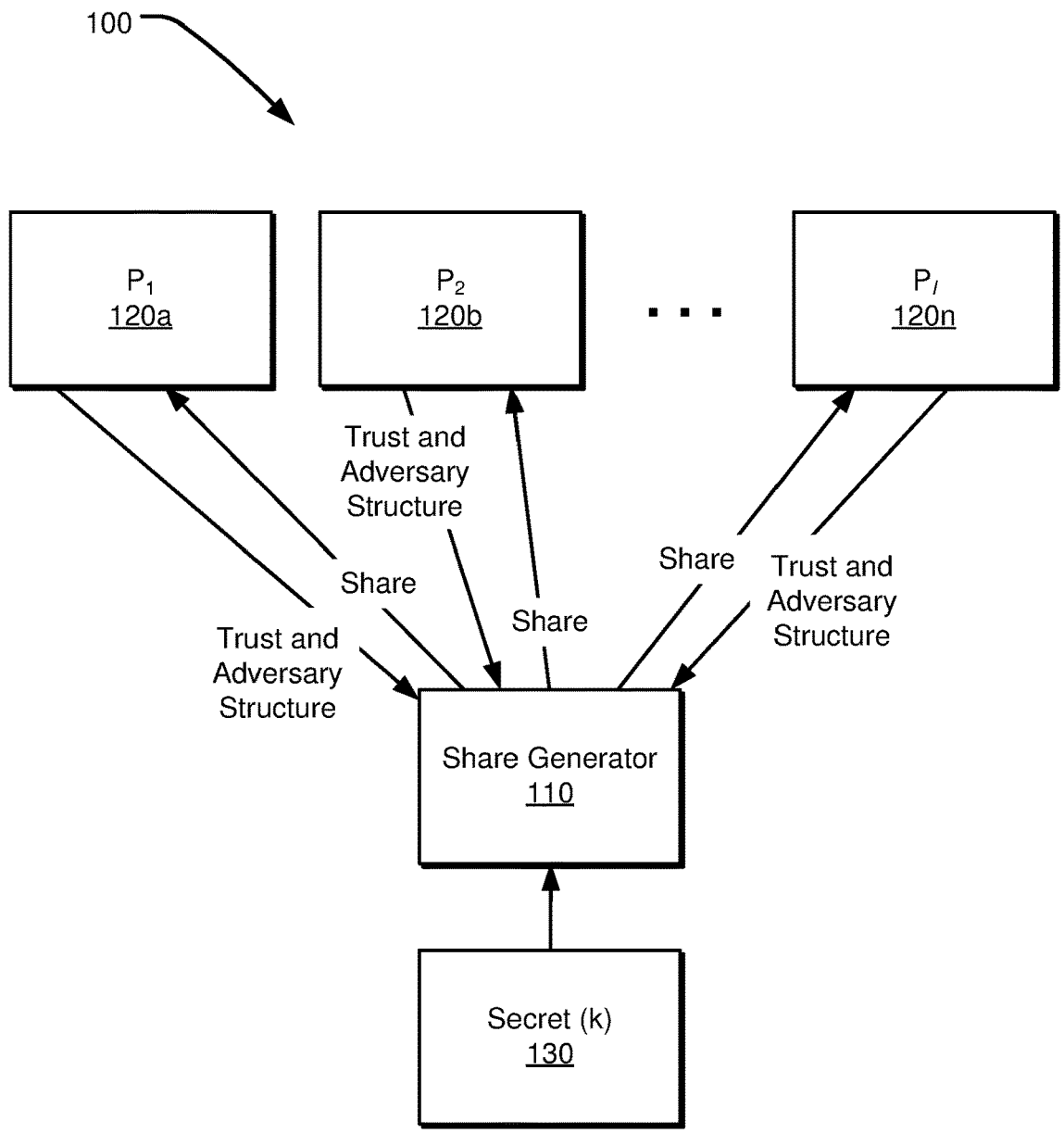
FIG. 1 illustrates an example of a secret sharing scheme in which parties provide their respective trust structures to a share generator and shares of a secret are generated and distributed to parties at least in part based on the trust structures, wherein the shares have encoded therein information regarding to an access structure for the scheme. All shares have equal entropy.

Secret sharing provides a means to distribute shares of a secret so that any authorized subset of participants may reconstruct the secret. In the field of computer science, such a secret may comprise data that may be stored in a memory device of a computing system comprising one or more computing devices. Shares of the secret (which may alternatively be referred to as share data) may be created. The shares of the secret may correspond to share data that can be provided to a plurality of computing devices. In turn, when shares are received from any authorized subset of participants, the shares may be used to recompute the secret (i.e., recreate the original data of the secret at a computing device). In trivial secret sharing, it may be that all of the computing devices to which share data has been provided must participate in reconstruction of the secret. This, however, is not optimal as certain parties may be compromised or lose the share data. In this scenario, the secret may not be capable of being reconstructed and the secret data lost.

Accordingly, in one example of a secret sharing scheme, a threshold is established corresponding to a given number of participants who must participate in a request to reconstruct the secret to successfully achieve secret reconstruction. In such a scheme, a total number of parties (n) are provided shares such that a threshold (t) number of parties must be participants in secret reconstruction to be successful. This is often referred to as the threshold case or a (t, n)-threshold scheme. In the traditional (t, n)-threshold scheme, the authorized subset of participates required to reconstruct the secret is defined by a publicly known access structure. That is, all participants know that so long as a threshold (t) or greater number of participants provide shares, the secret can be reconstructed.

However, certain scenarios may exist where multiple parties wish to perform secret sharing, but the parties to which a share has been provided do not trust each other completely. A multitude of such scenarios can be contemplated including, for example, potentially adverse business parties, potentially adverse government actors, or any other situation in which distrust between parties may exist. In relation to such a scenario, it has been proposed to utilize an asymmetric trust model. In such an asymmetrical trust model, each party to which a share has been provided is allowed to specify a trust structure. In the trust structure, each party declares which of the other parties having shares that it trusts. Such trust structures may be used to define one or more authorized subsets which specify the parties that are trusted by all or at least the majority of other parties, and/or adversary subsets which specify the parties that are not trusted by all or at least the majority of other parties.

In any regard, once each party having a share declares its trust structure, the protocol (applied by an entity sometimes referred to as a "dealer," which may or may not itself be a party having a share) uses the trust structures declared by each party to generate the authorized subset of participants required to successfully reconstruct the secret using the shares of the authorized subset of participants, all of which is known by the parties of the secret sharing scheme prior to secret reconstruction.

In this regard, prior proposed approaches for asymmetrical trust models require the trust structure of each party to be public. As can be readily understood, it is highly undesirable in practical settings for the trust structure of each party to be known by the other parties in the secret sharing scheme. For instance, heightened animosity, fear of retaliation, souring of relationships, or other adverse outcomes may occur when trust structures are publicly known. In fact, the problem of mandating public trust structures is common among all secret sharing schemes, irrespective of whether a secret sharing scheme supports threshold or general access structures.

Accordingly, the present disclosure utilizes secret trust structures. In the approach detailed herein, an authorized subset that is derived from trust structures of all parties remains unknown prior to secret reconstruction. As such, this allows parties having a share of a secret to define a trust structure in accord with the party's perceived trustworthiness of the other parties without the other parties being aware of any information related to such trust structures. In turn, the authorized subset of participants required to participate to successfully reconstitute a secret may be based on the secret trust structures of each party participating in the protocol.

In order to realize secret sharing with secret trust structures, the presently disclosed approach utilizes combinatorial objects. The combinatorial object is a mathematical structure that can be used to enhance the privacy guarantees of most distributed security protocols. In the approach described herein, combinatorial objects are constructed that succinctly "encode" trust and adversary structures. In turn, the encoded trust and adversary structures of each party provide no information regarding these structures for another party prior to secret reconstruction. That is, none of the parties are able to determine any information regarding the trust and adversary structures of the other parties, even if the party is in possession of the encodings of these structures specified by another party. Decoding the encoded trust structure requires all the parties in an authorized subset to collaborate. The authorized subset may be determined based on the encoded trust and adversary structures of the participants in a secret reconstruction. Thus, if the participants participating in the reconstitution are not an authorized set based on the encoded trust and adversary structures of each party, reconstruction of the secret fails and none of the parties will have information regarding the other parties' encoded trust and adversary structures.

The approaches described herein may utilize applications of extremal set theory, which provides how small or large a collection of sets can satisfy certain restrictions. The restrictions may relate to security parameters regarding the parties that participate in layered secret sharing protocol. An example of the encoding mechanism described herein allows representing $2^n$ authorized and unauthorized sets, corresponding to a trust structure, by a single vector inner product. In this regard, the total number of all possible such sets is $2^{2^{n-O(\log n)}}$.

The benefits of the solution described herein include that the scheme identifies a fundamental privacy violating flaw in the previous secret sharing models. The presently described scheme also enhances privacy in secret sharing by introducing the concept of secret trust and adversary structures. Also, the present scheme allows competitors to collaborate in a manner that enforces the trust and adversary structures of each party without revealing the mistrust among the parties. Moreover, the present scheme introduces novel combinatorial objects with multiple applications in distributed security.

Furthermore, the present disclosure provides a layered secret sharing scheme with flexible access structures. For example, consider a setting where multiple competitors wish to share secrets among a group, but each one of the parties distrusts a certain set of parties from the group. Sets of untrusted parties may be referred to as adversary structures. The aim of a well-designed layered secret sharing scheme is to enforce adversary structure of each party without providing any information regarding the adversary structure to the other parties (i.e., the parties should not be aware if they are part of another party's adversary structure). As such, there is a need to realize secret and asymmetric adversary structures.

As described above, in the standard general-adversary model for secret sharing and secure multi-party computation (MPC), an adversary structure is specified which basically lists all subsets of parties that we expect the adversary might be able to corrupt or is otherwise untrustworthy. That model is symmetric, i.e., every party is required to agree in the same adversary structure, which is public to the parties. This is both unnatural and undesirable because there is no inherent reason why the parties should all have the same view on which adversary structure best models a given scenario, and two parties may have completely contradictory beliefs on whether a third party can be corrupted/trusted or not, and insisting on one global adversary structure implies that the parties in it must consent to the fact that they themselves are completely untrusted.

In the present approach, the parties are allowed to declare individual, asymmetric adversary and trust structures to the dealer using encoded adversary and trust structures as described above. The individual adversary and trust structures are "tied" with the respective party's share in an encoded manner. This encodes the adversary structure "inside" the share, which does not provide any information regarding a party's adversary and trust structure to other parties in the secret sharing scheme. Combining the shares during secret reconstruction also combines the different encoded adversary and trust structures of the participating parties. Combining the adversary and trust structures here means application of a non-linear function on the individual adversary and trust structures supplied by the parties to generate unified and pragmatic adversary and trust structures. The scheme provides the benefit that if there is a majority of untrusted parties in the collaborating subset, then the secret reconstruction fails even if the collaborating subset contains an authorized subset from the access structure. In other words, a majority of untrusted structure is sufficient to "kill" any secret reconstruction from an otherwise authorized subset. A trust monitor (which can alternatively be referred to as a no-trust monitor) is introduced, which gives a false, random output if a collection of shares gets "killed" by some secret, asymmetric adversary structure. Otherwise, the output may be reconstruction of the secret.

The present solution may provide a plurality of layers of access structures. Thus, for example, a first subset of parties comprising an authorized subset may be negated or "killed" by a first adversary subset. However, a second, different subset of parties may be negated or "killed" by a second adversary subset. In this regard, the layered secret sharing scheme may comprise a plurality of layers with different respective authorized subsets and respective adversary subsets that govern the attempt to reconstruct a secret by pooling of shares of participating parties.

One benefit of the present approach is that is achieves secret adversary structures for secret sharing. Moreover, the approach detailed herein enforces the adversary structures of all parties. Further still, the present disclosure ties each party's adversary and trust structures with its share.

In view of the foregoing, the following discussion relates to mathematical concepts that facilitate secret access structures having the properties described above. Specifically, a system may have a plurality of parties defined as $\mathcal{P} = \{P_1, \ldots, P_\ell\}$. An access structure is defined as $\Gamma \subseteq 2^\mathcal{P}$, which is a monotone collection of non-empty subsets of the set of parties ($\mathcal{P}$). A collection $\Gamma \subseteq 2^\mathcal{P}$ is monotone $\mathcal{A} \in \Gamma$ and $\mathcal{A} \subseteq \mathcal{B}$ imply that $\mathcal{B} \in \Gamma$. Subsets in $\Gamma$ are called authorized, and subsets not in $\Gamma$ are called unauthorized. If $\Gamma$ consists of all subsets of $\mathcal{P}$ with size greater than or equal to a fixed threshold t where $(1 \leq t \leq \ell)$, then $\Gamma$ is called a t-threshold access structure. For an access structure $\Gamma$, a family of minimal authorized subsets $\Gamma_0 \in \Gamma$ is defined as:

$\Gamma_0 = \{\mathcal{A} \in \Gamma : \mathcal{B}$ is not a subset of $\mathcal{A}$ for all $\mathcal{B} \in \Gamma \setminus \{\mathcal{A}\}\}$ A computational secret sharing scheme may comprise of a pair of polynomial-time algorithms that are provided respect to an access structure ($\Gamma$), a security parameter ($\omega$), a set of $\ell$ polynomial-time parties $\mathcal{P} = \{P_1, \ldots, P_\ell\}$, and a set of secrets ($\mathcal{K}$). Polynomial-time algorithms are utilized in contrast to exponential algorithms to provide computational efficiency to the secret sharing scheme. In this regard, the secret sharing scheme may be conditionally secure against classical and quantum computing resources.

The polynomial-time algorithms may include a share generation algorithm and a secret reconstruction algorithm. The share generation algorithm is a randomized algorithm that gets a secret that is an element of the secret set ($k \in \mathcal{K}$) and access structure $\Gamma$ as inputs and outputs a share for each of the parties. That is, the share generation algorithm outputs a number of shares equal to the number of parties. The shares may be defined as $(\{\Pi_1^{(k)}, \ldots, \Pi_\ell^{(k)}\})$. In turn, each share can be provided to a party in the secret sharing scheme such that the access structure is encoded in the share by the share generation algorithm.

The secret reconstruction algorithm is a deterministic algorithm that gets as inputs the shares of a participating subset of the parties and outputs a string in the secret set. That is, the participating subset may be defined as $\mathcal{A} \subseteq \mathcal{P}$ denoted by $\{\Pi_i^{(k)}\}_{i \in \mathcal{A}}$.

In relation to the share generation algorithm and the secret reconstruction algorithm, the algorithms may provide perfect correctness and computational secrecy. In relation to perfect correctness, for all secrets that are an element of the secret set and every authorized subset in the access structure, the output of the secret reconstruction algorithm is the secret (for all $k \in \mathcal{K}$ and every authorized subset $\mathcal{A} \in \Gamma$, it holds that $\Pr[\text{Recon}(\{\Pi_i^{(k)}\}_{i \in \mathcal{A}}, \mathcal{A}) = k] = 1$).

In relation to computational secrecy, for each subset that is not authorized and for any different secrets from the secret set, the distributions of the shares for parties from the unauthorized set are computationally indistinguishable (for every subset $\mathcal{B} \notin \Gamma$ and all different secrets $k_1, k_2 \in \mathcal{K}$, it holds that the distributions $\{\Pi_i^{(k_1)}\}_{i \in \mathcal{B}}$ and $\{\Pi_i^{(k_2)}\}_{i \in \mathcal{B}}$ are computationally indistinguishable with respect to $\omega$). If $\forall k_1, k_2 \in \mathcal{K}$ with $k_1 \neq k_2$, the distributions $\{\Pi_i^{(k_1)}\}_{i \in \mathcal{B}}$ and $\{\Pi_i^{(k_2)}\}_{i \in \mathcal{B}}$ are identical, then the scheme is called a perfect sharing scheme.

The present invention generally utilizes Extremal Set Theory to construct set systems under certain intersection restrictions and bounding their size. In relation to utilization of such Extremal Set Theory, in one example, it is provided that $m = \prod_{i=1}^r p_i^{\alpha_i}$ is a positive integer with $r > 1$ different prime divisors. Then there exists an explicitly constructible polynomial Q with n variables and degree $O(n^{1/r})$, which is equal to 0 on $z = (1, 1, \ldots, 1) \in \{0,1\}^n$ but is nonzero mod m on all other $z \in \{0,1\}^n$. Furthermore, $\forall z \in \{0,1\}^n$ and $\forall i \in \{1, \ldots, r\}$, it holds that: $Q(z) \in \{0,1\}$ mod $p_i^{\alpha_i}$.

In addition, let m be a positive integer, and suppose that m has $r > 1$ different prime divisors: $m = \prod_{i=1}^r p_i^{\alpha_i}$. Then there exists $c = c(m) > 0$, such that for every integer $h > 0$, there exists an explicitly constructible uniform set-system $\mathcal{H}$ over a universe of h elements such that:

1. $|\mathcal{H}| \geq \exp\left(c \frac{(\log h)^r}{(\log \log h)^{r-1}}\right)$, 2. $\forall H \in \mathcal{H} : |H| \equiv 0 \mod m$, 3. $\forall G, H \in \mathcal{H}, G \neq H : |G \cap H| \not\equiv 0 \mod m$.

Matching vector (MV) families follow from the foregoing definition in which $m = \prod_{i=1}^r p_i^{\alpha_i}$ is a positive integer with $r > 1$ different prime divisors, and are used in cryptography in the context of private information retrieval, conditional disclosure of secrets, and secret sharing.

In addition, let m be a positive integer with $r > 1$ different prime divisors: $m = \prod_{i=1}^r p_i^{\alpha_i}$, and $S \subseteq \mathbb{Z}_m \setminus \{0\}$. The family of vectors $\{u_i\}_{i=1}^n$, $u_i \in (\mathbb{Z}_m)^h$ is said to be S-matching if the following conditions hold:

$\langle u_i, u_i \rangle = 0$ for every $i \in [n]$.   1.

$\langle u_j, u_j \rangle \in S$ for every $i \neq j$.   2 where $\langle \cdot \rangle$ denotes the inner product, and $h > 0$ is an integer.

The following result has been proven about the existence of MV families, modulo a non-prime power m. For positive integers h, r and $m = \prod_{i=1}^r p_i^{\alpha_i}$, there exists a set S, such that $|S| = 2^r - 1$, and a family of S-matching vectors $\{u_i\}_{i=1}^n$, where $u_i \in (\mathbb{Z}_m)^h$, such that $$n \geq \exp\left(c \frac{(\log h)^r}{\log \log^{r-1} h}\right).$$

Hence, MV families exist for values of h that are significantly smaller than n.

The secret sharing scheme described herein may also leverage discrete Gaussian sampling as will now be described. For any center $c \in \mathbb{R}$, and Gaussian parameter $s \in \mathbb{R}^+$, the discrete Gaussian distribution may be defined as:

$$D_{s,c} = \frac{\rho_{s,c}(x)}{\sum_{y=-\infty}^{\infty} \rho_{s,c}(y)},$$

$\forall x \in \mathbb{Z}$, where $\rho_{s,c}(x) = e^{-\pi |x-c|^2/s^2}$ is the Gaussian function. The parameters of discrete Gaussians are governed by the security proofs of the particular cryptosystem. A finite machine cannot sample from a discrete Gaussian distribution, hence one has to sample from a distribution close to it. It is a common practice to require that the statistical distance of the sampled distribution from the desired discrete Gaussian be less than $2^{100}$. A number of Gaussian sampling algorithms for lattice-based cryptosystems may be utilized herein without limitation Furthermore, a novel implementation of cumulative distribution function (CDF) inversion sampler with high precision and large tail bound has been demonstrated with maximum statistical distance of $2^{-90}$ to a theoretical discrete Gaussian distribution. Such a sampler takes on average 9.44 random bits and 2.28 clock cycles to generate a sample, and consumes 1 block RAM with 17 slices on a Spartan-6 FPGA. Hence, efficient and practical Gaussian sampling for lattice-based cryptography is becoming more practical.

Generation of shares may also utilize concepts related to the Learning With Errors (LWE) problem. The learning with errors (LWE) problem requires to recover a secret s given a sequence of 'approximate' random linear equations on it. LWE is known to be hard based on certain assumptions regarding the worst-case hardness of standard lattice problems such as GapSVP (decision version of the Shortest Vector Problem) and SIVP (Shortest Independent Vectors Problem). Many cryptosystems have been constructed whose security can be proven under the LWE problem, including (identity-based, leakage-resilient, fully homomorphic, functional) encryption, oblivious transfer, (blind) signatures, pseudorandom functions (PRFs), key-homomorphic PRFs, key-homomorphic constrained PRFs, hash functions, etc.

Two examples of implementation of LWE are described. The first is Decision-LWE. In this example, for positive integers n (the security parameter) and q≥2, and an error (probability) distribution $\chi=\chi(n)$ over $\mathbb{Z}_q$, the decision-$LWE_{n,q,\chi}$ problem is to distinguish between the following pairs of distributions:

$(A, A^T s + e)$ and $(A, u)$, where $m = \text{poly}(n)$, $A \xleftarrow{\$} \mathbb{Z}_q^{n \times m}$, $s \xleftarrow{\$} \mathbb{Z}_q^n$, $e \xleftarrow{\$} \chi^m$, and $u \xleftarrow{\$} \mathbb{Z}_q^m$.

The other is Search-LWE for which positive integers n (the security parameter) and q≥2, and an error (probability) distribution $\chi=\chi(n)$ over $\mathbb{Z}_q$, the search-$LWE_{n,q,\chi}$ problem is to recover $s \in \mathbb{Z}_q^n$, given m(=(n)) independent samples of $(A, A^T s + e)$, where $A \xleftarrow{\$} \mathbb{Z}_q^{n \times m}$, $s \xleftarrow{\$} \mathbb{Z}_q^n$, and $e \xleftarrow{\$} \chi^m$.

For security parameter λ such that n=(λ), it has been proven that for a certain noise distribution χ and a sufficiently large q, the LWE problem is as hard as the worst-case SIVP (Shortest Independent Vectors Problem) and GapSVP (decision version of the Shortest Vector Problem) under a quantum reduction. These results have been extended to show that s can be sampled from a low norm distribution (in particular, from the noise distribution χ) and the resulting problem is as hard as the basic LWE problem. Similarly, the noise distribution χ can be a simple low-norm distribution.

Note that the seed and error vectors in the definitions can be replaced by matrices of appropriate dimensions, that are sampled from the same distributions as the vectors. Such interchange does not affect the hardness of LWE.

The present disclosure may also utilize Trapdoors for Lattices. Trapdoors for lattices utilized in the present disclosure are provided herein. For example, let m≥nk be an integer and $\bar{m}=m-nk$. For $A \in \mathbb{Z}_q^{n \times m}$, it may be that $R \in \mathbb{Z}_q^{\bar{m} \times nk}$ is a trapdoor for A with tag $H \in \mathbb{Z} q^{n \times m}$ if $$A \begin{bmatrix} R \\ I \end{bmatrix} = H \cdot G,$$

where $G \in \mathbb{Z}_q^{n \times nk}$ is a primitive matrix.

Given a trapdoor R for A, and an LWE instance B=AS+E mod q for some "short" (with small enough infinity or Euclidean norm) error matrix $E \in \mathbb{Z}^{m \times n}$ the LWE inversion algorithm from successfully recovers S (and E) with overwhelming probability.

In addition, the present disclosure may utilize Multilinear Maps. Extending bilinear elliptic curve pairings to multilinear maps is a long-standing open problem. Two interesting applications of multilinear maps have been proposed, namely multipartite Diffie-Hellman and very efficient broadcast encryption. However, such maps have been considered not possible from the realm of algebraic geometry. Bilinear pairings may provide that the encoding a·g of an element a is randomized (with some noise) instead of deterministic; only the computed multilinear map $e(a_1 \cdot g, \ldots, a_k \cdot g)$ is a deterministic function of the $a_i$'s only. The construction has bounded degree with a maximum degree k at most polynomial in the security parameter. Indeed, the encoding noise grows linearly with the degree, and when the noise reaches a certain threshold, the encoding can become incorrect similar to the ciphertexts in a somewhat homomorphic encryption scheme. The security of the construction relied on new hardness assumptions which seemed natural extensions of the Decisional Diffie-Hellman (DDH) assumption.

The GGH15 scheme is one type of family of multilinear maps, based on the LWE problem with encoding over matrices. A graded encoding scheme for an algebraic "plaintext ring R" provides methods for encoding the ring elements and manipulating the resulting encodings. Such schemes allow a "canonical representation" of the plaintext element to be extracted from its encoding. GGH15 encodes LWE samples in short square matrices of higher dimensions. Addition and multiplication of the encodings corresponds to addition and multiplication of the LWE secrets. The plaintext space is the non-commutative ring of matrices $R=\mathbb{Z}_q^{n \times n}$. The construction is parametrized by a directed acyclic graph (DAG), G=(V,E), with diameter d. A matrix $A_v \xleftarrow{\$} \mathbb{Z}_q^{m \times n}$ is associated with each node v∈V, and encodings in the scheme are defined relative to the paths in G. A small plaintext matrix S∈R is encoded with respect to a path u⤳v via another small matrix $D \in \mathbb{Z}_q^{m \times m}$, such that $D \cdot A_u \approx A_v \cdot S$. Given 'trapdoor information' $\tau_u$ for matrix $A_u$ and error distribution $\chi=D_{\mathbb{Z},s}$ GGH15 generates an encoding D for S with respect to source u and sink v, such that: $D \cdot A_u = A_v \cdot S + E$, where $E \leftarrow (\chi)^{m \times m}$ is an LWE error matrix. As the trapdoor information is given for $A_u$ and not $A_v$, the LWE instance $\{A_v, B_v(=A_v \cdot S+E)\}$ can still be hard for appropriate parameters. The arithmetic operations are just matrix operations in $\mathbb{Z}_q^{m \times n}$. It is easy to see that two encodings, $D_1$ and $D_2$, relative to the same path u⤳v can be added, namely from: $D_1 \cdot A_u = A_v \cdot S_1 + E_1$ and $D_2 \cdot A_u = A_v \cdot S_2 + E_2$, we obtain: $(D_1+D_2) \cdot A_u = A_v \cdot (S_1+S_2)+E_1+E_2$, all matrices, $S_1+S_2$, $E_1$ $E_2$ and $D_1+D_2$, are still small. Encodings relative to paths v⤳w and u⤳v, can be multiplied to get an encoding relative to path u⤳w. Namely given $D_1 \cdot A_v = A_w \cdot S_1 + E_1$ and $D_2 \cdot A_u = A_v \cdot S_2 + E_2$, we obtain: $D_1 \cdot D_2 \cdot A_u = D_1 \cdot (A_v \cdot S_2 + E_2) = A_w \cdot S_1 \cdot S_2 + E'$, the matrices, $D_1 \cdot D_2$, $S_1 \cdot S_2$ and $E'$ are still small.

In a secret sharing scheme having layered secret sharing as described herein, a layered access structure $\daleth \subseteq 2^{\mathcal{P}}$ is defined by two independent family of subsets. One subset comprises an access structure $\Gamma \subseteq 2^{\mathcal{P}}$. The other subset includes a kill structure $\nabla \subseteq 2^{\mathcal{P}}$. Here $\Gamma$ is the access structure as defined above, and $\daleth$ is defined as follows:

$$\daleth = \{\mathcal{A} \in \Gamma \text{ such that } \mathcal{B} \not\subseteq \nabla \text{ for all } \mathcal{B} \subseteq \mathcal{A}\}$$

A layered computational secret sharing scheme may be defined with respect to an access structure $\Gamma$, a set of $\ell$ polynomial-time parties $\mathcal{P} = \{P_1, \ldots, P_\ell\}$, a set of secrets $\mathcal{K}$ and a security parameter $\omega$. The secret sharing scheme may include of two pairs of polynomial-time algorithms. The first pair includes a layered identifiers generation algorithm (LiGen) and a layered identifier verification algorithm (LiVer). The second pair of algorithms is similar to those described above and comprise a layered identifier share generation algorithm (LiShare) and a layered identifier secret reconstruction algorithm (LiRecon).

In relation to these algorithms, LiGen is a randomized algorithm that gets $\mathcal{P}$, $\Gamma$ and $\nabla$ as inputs, and outputs $\ell$ layered identifiers $\{v_1^{(\gamma)}, \ldots, v_\ell^{(\gamma)}\}$. LiVer is a deterministic algorithm that gets as input the layered identifiers of a subset $\mathcal{A} \subseteq \mathcal{P}$, denoted by $\{v_i^{(\gamma)}\}_{i \in \mathcal{A}}$, and outputs $b \in \{0,1\}$, such that the algorithm enforces Perfect Completeness and Perfect Soundness. For Perfect Completeness every qualified subset of parties $\mathcal{A} \in \daleth$ can identify itself to be a member of the layered access structure $\daleth$ (i.e., formally, it holds that: $Pr[\text{LiVer}(\{v_i^{(\gamma)}\}_{i \in \mathcal{A}}) = 1] = 1$.). For Perfect Soundness every unqualified subset of parties $\mathcal{B} \notin \daleth$ can identify itself to be outside of the layered access structure $\daleth$ (i.e., formally, it holds that: $Pr[\text{LiVer}(\{v_i^{(\gamma)}\}_{i \in \mathcal{B}}) = 0] = 1$.)

LiShare is a randomized algorithm that gets a secret $k \in \mathcal{K}$ and layered access structure $\daleth$ as inputs, and outputs $\ell$ shares, $\{\Pi_1^{(k)}, \ldots, \pi_\ell^{(k)}\}$, of the secret k. LiRecon is a deterministic algorithm that gets as input the shares of a subset $\mathcal{A} \subseteq \mathcal{P}$, denoted by $\{\pi_i^{(k)}\}_{i \in \mathcal{A}}$, and outputs a string in $\mathcal{K}$, such that LiRecon satisfies Perfect Correctness, Computational Secrecy, and Computational Hiding. For Perfect Correctness, for all secrets $k \in \mathcal{K}$ and every qualified subset $\mathcal{A} \in \daleth$, it holds that: $Pr[\text{LiRecon}(\{\pi_i^{(k)}\}_{i \in \mathcal{A}}, \mathcal{A}) = k] = 1$. For Computational Secrecy, for every unqualified subset $\mathcal{B} \notin \daleth$ and all different secrets $k_1, k_2 \in \mathcal{K}$, it holds that the distributions $\{\pi_i^{(k_1)}\}_{i \in \mathcal{B}}$ and $\{\pi_i^{(k_2)}\}_{i \in \mathcal{B}}$ are computationally indistinguishable (with respect to $\omega$). In relation to Computational Hiding for all access structures $\daleth$, $\daleth' \subseteq 2^{\mathcal{P}}$, where $\daleth \neq \daleth'$, and each subset of parties $\mathcal{B} \notin \daleth$, $\daleth'$ that is unauthorized in both $\daleth$ and $\daleth'$, it holds that:

$$|Pr[\daleth \mid \{v_i^{(\gamma)}\}_{i \in \mathcal{B}}, \{\pi_i^{(k)}\}_{i \in \mathcal{B}}] - Pr[\daleth' \mid \{v_i^{(\gamma)}\}_{i \in \mathcal{B}}, \{\pi_i^{(k)}\}_{i \in \mathcal{B}}]| \leq \in(\omega),$$

where $\in$ is a negligible function.

With reference to FIG. 1, such a secret sharing scheme 100 is depicted schematically. The scheme 100 includes a share generator 110. The share generator 110 may comprise a share generation module executable by the computing device comprising the share generator. The share generator 110, as will be described in greater detail below receives as inputs trust and adversary structures from each party in the scheme and a secret 130 k. In turn, the share generator 110 may utilize the share generation algorithm to generate shares that are distributed to the parties. 120. The trust and adversary structures may be represented by trust vectors that may comprise a trust subset of parties that the party trusts and an anti-trust subset (also referred to as an adversary subset) of the parties the party does not trust. The shares may be generated that encodes the trust and adversary subsets from the parties into the shares in a manner that does not provide any information to the parties regarding the trust and adversary subsets of any of the other parties.

The share generator 110 may comprise a computing device comprising, for example, one or more hardware processors and memory devices. The hardware processors may access the share generation algorithm, which may be stored in a memory device of the share generator 110. As will also be described in greater detail below, the share generator 110 may generate an identifier for each party in the scheme. A layered identifier generation algorithm may be executed by a layered identifier generation module. In turn, the one or more hardware processors of the share generator 110 may execute the layered identifier generation algorithm and share generation algorithm to generate party identifiers and the shares. Thus, while the identifiers are not shown in FIG. 1, they may be provided with the share as reflected in the figure. The shares may encode a unified authorized subset for the scheme in which a trust structure and an adversary structure are generated by application of a non-linear function on the trust and adversary structures of each party. The authorized subset may be encoded in the shares without providing any information regarding the individual trust and adversary structures of a party to any other party in the scheme. The shares may be communicated to the parties 120a, 120b, . . . 120n, which themselves may be computing devices comprising one or more hardware processors and memory devices. The shares may be communicated to the parties 120 by way of a network or other digital communication methodology. In this regard, the shares may be stored in a respective memory device of the party 120 that receives the shares. As described above, the secret 130 may comprise data received at the share generator 110. A share may comprise share data that is provided to and stored in a memory device of each respective parties 120.

Figure 2:
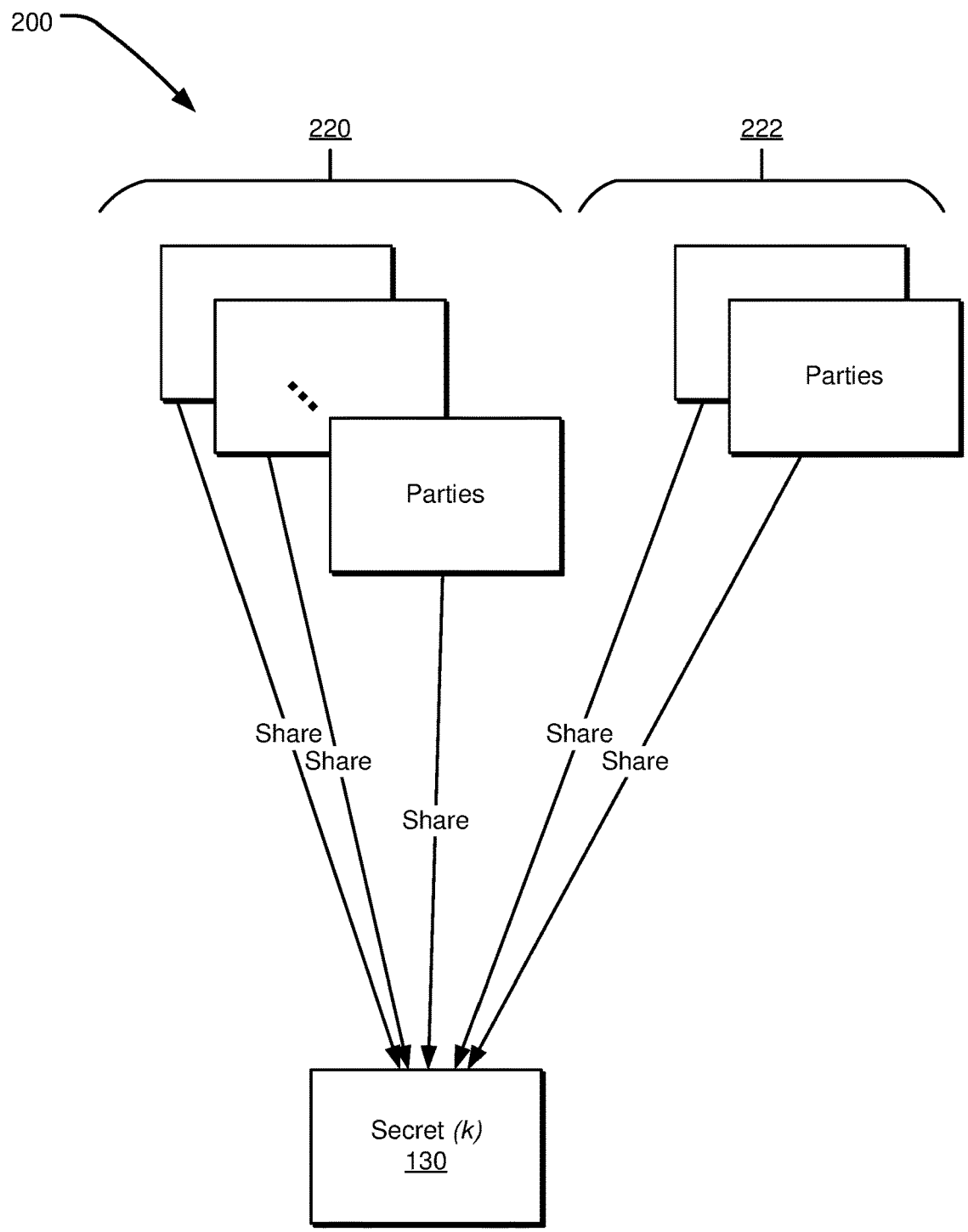
FIG. 2 illustrates an example of a request for secret reconstruction from a plurality of participant computing devices belonging to an authorized subset in which the adversary subset is not present in its entirety.

In turn, with further reference to FIG. 2, a subset of authorized participants 220 comprising an authorized subset defined by an access structure provide shares for secret reconstruction. In addition, in the scenario depicted in FIG. 2, a number of adverse parties are present, but the adverse parties do not comprise an adversary subset of participants. In turn, each party 120 exchange their shares and the secret 130 k may be computed by the parties in the collaborating subset. The access structure $\Gamma$ may be at least in part based on trust an adversary structures provided by the parties 120 that are used in the share generation algorithm executed by the share generator 110. Thus, the shares provided to the parties may have encoded therein trust and adversary structures without providing any information regarding the trust and adversary structures to a party having a share. However, upon exchanging the shares provided may reconstruct the secret 130 when the participants 220 comprise an authorized subset based on the trust structures and an adversary subset as defined by the adversary structures are not participating. In this regard, the shares may be provided by the participants 220 in a request to reconstruct the secret. If the parties 220 are an authorized subset based on the trust and adversary structures of the participating parties, the output of the secret reconstruction algorithm executed by the collaborating subset is the secret 130.

Figure 3:
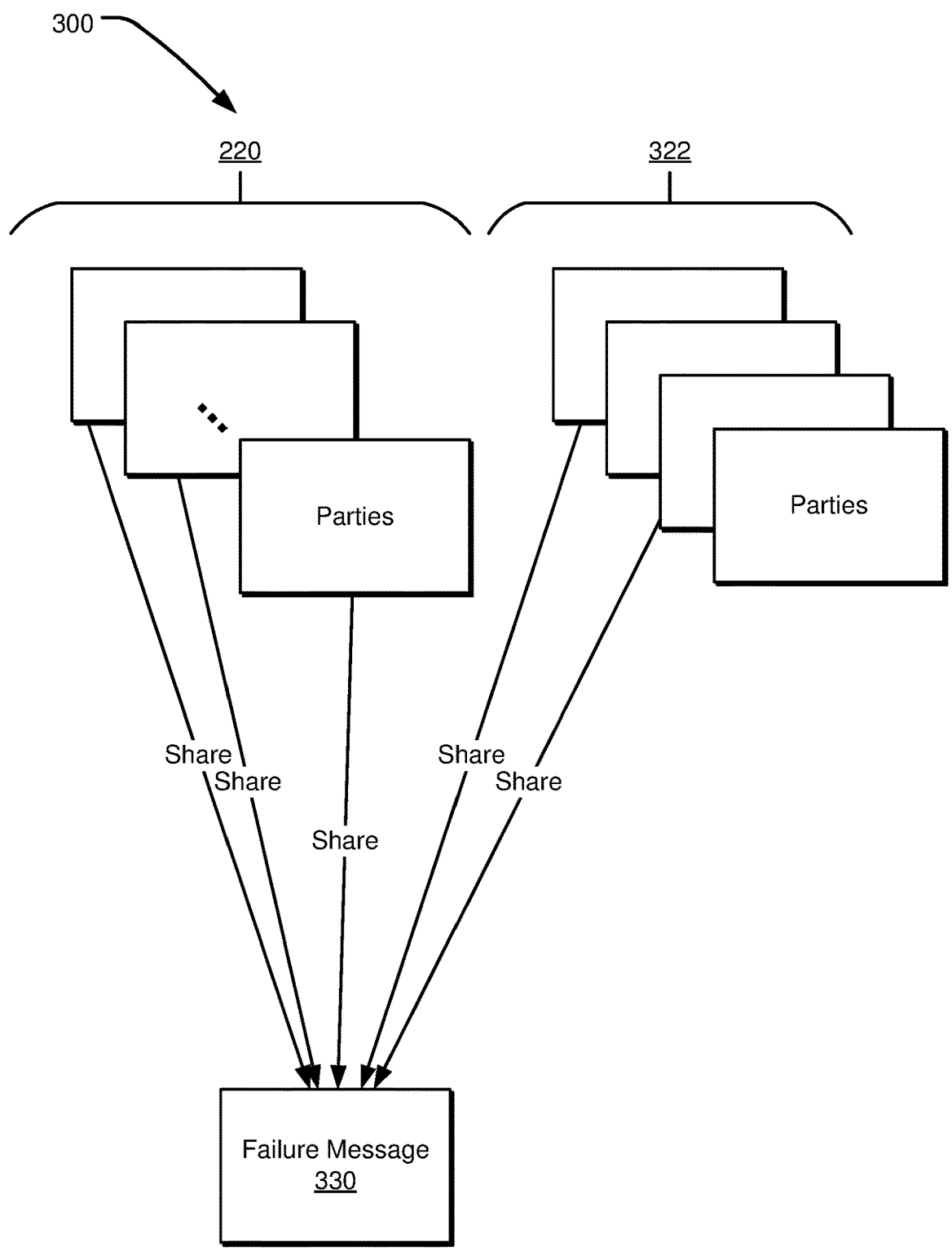
FIG. 3 illustrates an example of a request for secret reconstruction from a plurality of participant computing devices not belonging to an authorized subset in which an adversary subset is present.

With further reference to FIG. 3, a scenario is depicted in which, while an authorized subset 220 is present, but an adversary subset 322 is also present. In turn, the participating parties 330 exchanging shares will not result in output of the secret 130 upon execution of the secret reconstruction algorithm. Rather, a failure message 330 may be output indicating the secret was not reconstructed.

The share generator 110 may comprise a party of the secret sharing scheme. Alternatively, the share generator 110 may not comprise a party that receives a share.

Combinatorial objects utilized in the secret sharing scheme are described below. For example, let $\{G_1, G_2, \ldots, G_t\}$ be a family of sets, which may relate to combinations of participants each providing shares in a secret sharing scheme. The set family is non-degenerate if there does not exist $1 \leq i \leq t$ such that $G_i \subseteq G_j$ for all $1 \leq j \leq t$. Also, let $m \geq 2$, $t \geq 2$ be integers and $\mathcal{H}$ be a set-system. We shall say that $\mathcal{H}$ has t-wise restricted intersections modulo m if the following bounding conditions are provided:

Bounding condition 1. $\forall H \in \mathcal{H}$, $|H| \equiv 0 \bmod m$,

Bounding condition 2. $\forall t'$ satisfying $2 \leq t' \leq t$, and $\forall H_1, H_2, \ldots, H_{t'} \in \mathcal{H}$ with $\{H_1, H_2, \ldots, H_{t'}\}$ non-degenerate, $$\left| \bigcap_{\tau=1}^{t'} H_\tau \right| \not\equiv 0 \bmod m$$

Furthermore, let $m \geq 2$ and $l \geq 2$ be integers such that m has no prime factors $\leq l$. Suppose there exists an integer $t \geq 2$ and a uniform set system $\mathcal{G}$ satisfying the conditions:

Set condition 1. $\forall G \in \mathcal{G}$, $|G| \equiv 0 \bmod m$,

Set condition 2. $\forall t'$ such that $2 \leq t' \leq t$, and $\forall G_1, G_2, \ldots, G_{t'} \in \mathcal{G}$ distinct, $$\left| \bigcap_{\tau=1}^{t'} G_\tau \right| \equiv \mu \bmod m$$

for some $\mu$ such that $\mu \not\equiv 0 \bmod m$ and $\mu \equiv 0$ or $1 \bmod p$ for all primes p dividing m, Set condition 3. $|\bigcap_{G \in \mathcal{G}} G| \not\equiv 0 \bmod m$.

With this scenario, there exists a set-system $\mathcal{H}$, explicitly constructible from the set system $\mathcal{G}$, which contains sets with exactly two different sizes, such that:

Construction Proposition 1. $\forall H_1, H_2 \in \mathcal{H}$, either $|H_1| = |H_2|$, $|H_1| = l|H_2|$ or $l|H_1| = |H_2|$, Construction Proposition 2. $\mathcal{H}$ has t-wise restricted intersections modulo m.

Expanding the proof of the foregoing scenario, a l uniform set systems $\mathcal{H}_1, \mathcal{H}_2, \ldots, \mathcal{H}_l$ is provided satisfying the following properties:

Set Property 1. $\forall H \in \mathcal{H}_i$, $|H| \equiv 0 \bmod m$,

Set Property 2. $\forall t'$ such that $2 \leq t' \leq t$, and $\forall H_1, H_2, \ldots, H_{t'} \in \mathcal{H}_i$ distinct, $$\left| \bigcap_{\tau=1}^{t'} H_\tau \right| \equiv \mu \bmod m$$

for some $\mu$ such that $\mu \not\equiv 0 \bmod m$ and $\mu \equiv 0$ or $1 \bmod p$ for all primes p dividing m, Set Property 3. $\bigcap_{H \in \mathcal{H}_i} H| \not\equiv 0 \bmod m$, Set Property 4. $|H_i| = |H_j|$ for all $H_i \in \mathcal{H}_i$, $H_j \in \mathcal{H}_j$, Set Property 5. $|\bigcap_{H_i \in \mathcal{H}_i} H_i| = |\bigcap_{H_j \in \mathcal{H}_j} H_j|$ for all $1 \leq i, j \leq l$.

Bijections may be fixed:

$$f_{i,j}: \bigcap_{H_i \in \mathcal{H}_i} H_j \to \bigcap_{H_j \in \mathcal{H}_j} H_j.$$

such that $f_{i,i}$ is the identity and $f_{i,j} \circ f_{j,k} = f_{i,k}$ for all $1 \leq i, j, k \leq l$. Using these bijections, we can identify the sets $\bigcap_{H_i \in \mathcal{H}_i} H_i$ and $\bigcap_{H_j \in \mathcal{H}_j} H_j$ with each other, so let $$A = \bigcap_{H_1 \in \mathcal{H}_1} H_1 = \bigcap_{H_2 \in \mathcal{H}_2} H_2 = \ldots = \bigcap_{H_l \in \mathcal{H}_l} H_l.$$

The elements of the sets in $\mathcal{H}_i$ may be treated as being distinct from the elements of the sets in $\mathcal{H}_j$, except for the above identification of elements in $\bigcap_{H_i \in \mathcal{H}_i} H_i$ with elements in $\bigcap_{H_j \in \mathcal{H}_j} H_j$. Let $a = |A|$, and let $\beta_1, \beta_2, \ldots, \beta_{(l-1)a}$ be elements that are distinct from all the elements in the sets in $\mathcal{H}_1, \mathcal{H}_2, \ldots \mathcal{H}_l$. The set may be defined:
$B = \beta_1, \beta_2, \ldots, \beta_{(l-1)a}$.

In addition, a set system $\mathcal{H}$ may be provided with sets:
$H_i$ for $H_i \in \mathcal{H}_i$, some $1 \leq i \leq l$,
$\bigcup_{i=1}^{l} H_i \cup B$ for $H_i \in \mathcal{H}_i$.

The common size of the sets may be written in the uniform set systems $\mathcal{H}_i$ as km for some $k > 0$. Then, for $H_i \in \mathcal{H}_i$, $$\left| \bigcup_{i=1}^{l} H_i \cup B \right| = \left| \bigcup_{i=1}^{l} H_i \right| + |B| =$$

$$\sum_{i=1}^{l} |H_i| - (l-1)|A| + |B| = l(km) - (l-1)a + (l-1)a = lkm,$$

where the second equality comes from the fact that $H_i \cap H_j = A$ for all $i \neq j$. This shows that Construction Proposition 1 holds.

In relation to Construction Proposition 2 that $\mathcal{H}$ has t-wise restricted intersections modulo m, the proof may be shown by letting $t_1, t_2, \ldots, t_{l+1} \geq 0$ be such that $2 \leq t' = t_1 + t_2 + \ldots + t_{l+1} \leq t$. Considering the intersection of the sets:
$H_{i,\tau}$ where $1 \leq i \leq l$, $1 \leq \tau \leq t_i$ and $H_{i,\tau} \in \mathcal{H}_i$,
$\bigcup_{i=1}^{l} H_{i,\tau}' \cup B$ where $1 \leq \tau \leq t_{l+i}$ and $H_{i,\tau}' \in \mathcal{H}_i$.

Assume that these sets form a non-degenerate family. In turn, let $$\sigma = \left| \bigcap_{i=1}^{l} \bigcap_{\tau=1}^{t_i} H_{i,\tau} \cap \bigcap_{\tau=1}^{t_{l+1}} (H_{1,\tau}' \cup H_{2,\tau}' \cup \cdots \cup H_{l,\tau}' \cup B) \right| =$$

$$\left| \bigcap_{i=1}^{l} \bigcap_{\tau=1}^{t_i} H_{i,\tau} \cap \bigcap_{\tau=1}^{t_{l+1}} (H_{1,\tau}' \cup H_{2,\tau}' \cup \cdots \cup H_{l,\tau}') \right| + \epsilon |B|,$$

where $\epsilon = 1$ if $t_1 = t_2 = \ldots = t_l = 0$ and $\epsilon = 0$ otherwise.

If two or more of $t_1, t_2, \ldots, t_l$ are non-zero, $\sigma = |A| = a \not\equiv 0 \bmod m$. If exactly one of $t_1, t_2, \ldots, t_l$ is non-zero, say $t_i \neq 0$, then $$\sigma = \left| \bigcap_{\tau=1}^{t_i} H_{i,\tau} \cap \bigcap_{\tau=1}^{t_{l+1}} H_{i,\tau}' \right| \not\equiv 0 \bmod m$$

since $H_{i,\tau}$ (for $1 \leq \tau \leq t_l$) and $H_{i,\tau}'$ (for $1 \leq \tau \leq t_{l+1}$) are not all the same by the assumption of non-degeneracy. If $t_1 = t_2 = \ldots = t_l = 0$, then $$\sigma = \left| \bigcap_{\tau=1}^{t_{l+1}} (H_{1,\tau}' \cup H_{2,\tau}' \cup \cdots \cup H_{l,\tau}') \right| + |B| =$$

$$\sum_{i=1}^{l} \left| \bigcap_{\tau=1}^{t_{l+1}} H_{i,\tau}' \right| - (l-1)|A| + |B| \equiv \sum_{i=1}^{l'} \mu_i \mod m$$

for some $1 \leq l' \leq l$ and some $0 < \mu_1, \mu_2, \ldots, \mu_{l'} < m$ such that each $\mu_i \equiv 0$ or $1 \mod p$ for all primes $p$ dividing $m$. Since $\mu_i \not\equiv 0 \mod m$ for all $1 \leq i \leq l'$, there must be some prime $p$ dividing $m$ for which at least one of the $\mu_i$'s satisfy $\mu_i \equiv 1 \mod p$. Then, for this prime $p$, $$\sigma \equiv \sum_{i=1}^{l'} \mu_i \not\equiv 0 \mod p$$

since $p$, being a prime factor of $m$, satisfies $p > l \geq l'$, and since each $\mu_i \equiv 0$ or $1 \mod p$. In this regard, Construction Proposition 2 holds.

In addition, suppose that $|\mathcal{G}| = s$ and that the number of elements in the universe of $\mathcal{G}$ is $g$. Then, there are $ls$ sets of size $km$ and $s^l$ sets of size $lkm$ in $\mathcal{H}$, so $|\mathcal{H}| = s^l + ls$. The universe of $\mathcal{H}$ has $lg$ elements. Also, for each $H \in \mathcal{H}$, exactly one of the following is true:

(a) $H$ is a subset of exactly $s^{l-1}$ sets and not a superset of any sets in $\mathcal{H}$, (b) $H$ is a superset of exactly $l$ sets and not a subset of any sets in $\mathcal{H}$.

In order to explicitly construct set systems which, in addition to having the Bounding Conditions stated above, have sizes super-polynomial in the number of elements, the following details an approach used to construct a super polynomial uniform set-system that provides a solution for reconstruction of a secret from participants belonging to an authorized set based on the trust structures encoded with the secret shares.

Let $m = p_1^{\alpha_1} p_2^{\alpha_2} \ldots p_r^{\alpha_r}$ be a positive integer with $r > 1$ distinct prime divisors. For every integer $n \geq 1$, there exists an explicitly constructible polynomial $P$ in $n$ variables such that 1. $P(0, 0, \ldots, 0) \equiv 0 \mod m$,
2. $P(x) \not\equiv 0 \mod m$ for all $x \in \{0,1\}^n$ such that $x \neq (0, 0, \ldots, 0)$,
3. $P(x) \equiv 0$ or $1 \mod p_i$ for all $x \in \{0,1\}^n$ such that $x \neq (0, 0, \ldots, 0)$, $1 \leq i \leq r$.

The polynomial $P$ has degree $d = \max(p_1^{e_1}, p_2^{e_2}, \ldots, p_r^{e_r}) - 1$ where $e_i$ is the smallest integer that satisfies $$p_i^{e_i} > \left\lceil n^{\frac{1}{r}} \right\rceil.$$

Define $Q(x_1, x_2, \ldots, x_n) = P(1-x_1, 1-x_2, \ldots, 1-x_n)$. Then
1. $Q(1, 1, \ldots, 1) \equiv 0 \mod m$,
2. $Q(x) \not\equiv 0 \mod m$ for all $x \in \{0,1\}^n$ such that $x \neq (1, 1, \ldots, 1)$,
3. $Q(x) \equiv 0$ or $1 \mod p_i$ for all $x \in \{0,1\}^n$ such that $x \neq (1, 1, \ldots, 1)$, $1 \leq i \leq r$.

In addition, let $m = p_1^{\alpha_1}, p_2^{\alpha_2} \ldots p_r^{\alpha_r}$ be a positive integer with $r > 1$ distinct prime divisors. For every integer $n \geq 1$, there exists a uniform set system $\mathcal{G}$ over a universe of $g$ elements which is explicitly constructible from the polynomial $Q$ of degree $d$ such that

1.

$$g < \frac{2(m-1)n^{2d}}{d!} \text{ if } n \geq 2d,$$

2. $|\mathcal{G}| = n^n$,
3. $\forall G \in \mathcal{G}$, $|G| \equiv 0 \mod m$,
4. $\forall G, H \in \mathcal{G}$ such that $G \neq H$, $|G \cap H| \equiv \mu \mod m$ for some $\mu$ such that $\mu \not\equiv 0 \mod m$ and $\mu \equiv 0$ or $1 \mod p_i$ for all $1 \leq i \leq r$, 5. $|\bigcap_{G \in \mathcal{G}} G| \equiv 0 \mod m$.

Note that (v) follows from the fact that:

$$\left| \bigcap_{G \in \mathcal{G}} G \right| \equiv Q(0, 0, \ldots, 0) \not\equiv 0 \mod m.$$

Furthermore, let $m = p_1^{\alpha_1} p_2^{\alpha_2} \ldots p_r^{\alpha_r}$ be a positive integer with $r > 1$ distinct prime divisors. For all integers $t \geq 2$ and $n \geq 1$, there exists a uniform set system $\mathcal{G}$ over a universe of $g$ elements which is explicitly constructible from the polynomial $Q$ of degree $d$ such that

1.

$$g < \frac{2(m-1)n^{2d}}{d!} \text{ if } n \geq 2d,$$

2. $|\mathcal{G}| = n^n$,
3. $\forall G \in \mathcal{G}$, $|G| \equiv 0 \mod m$,
4. $\forall t'$ such that $2 \leq t' \leq t$, and $\forall G_1, G_2, \ldots, G_{t'} \in \mathcal{G}$ distinct, $$\left| \bigcap_{\tau=1}^{t'} G_\tau \right| \equiv \mu \mod m$$

for some $\mu$ such that $\mu \not\equiv 0 \mod m$ and $\mu \equiv 0$ or $1 \mod p_i$ for all $1 \leq i \leq r$, 5. $|\bigcap_{G \in \mathcal{G}} G| \not\equiv 0 \mod m$.

The polynomial $Q$ can be written as $$Q(x_1, x_2, \ldots, x_n) = \sum_{i_1 < i_2 < \cdots < i_l} a_{i_1, i_2, \ldots, i_l} x_{i_1} x_{i_2} \cdots x_{i_l}$$

Define:

$$\tilde{Q}(x_1, x_2, \ldots, x_n) = \sum_{i_1 < i_2 < \cdots < i_l} \tilde{a}_{i_1, i_2, \ldots, i_l} x_{i_1} x_{i_2} \cdots x_{i_l}$$

where $\tilde{a}_{i_1, i_2, \ldots, i_l}$ is the remainder when $a_{i_1, i_2, \ldots, i_l}$ is divided by $m$.

Let $[0,n-1]=\{0, 1, \ldots, n-1\}$. Define the function $\delta$: $[0,n-1]^t \to \{0,1\}$ as $$\delta(u_1, u_2, \ldots, u_t) = \begin{cases} 1 & \text{if } u_1 = u_2 = \cdots \equiv u_t, \\ 0 & \text{otherwise} \end{cases}.$$

For $y_1, y_2, \ldots, y_t \in [0,n-1]^n$, let $$a^{y_1,y_2,\ldots,y_t} = \tilde{Q}(\delta(y_{1,1},y_{2,1},\ldots,y_{t,1}), \ldots, \delta(y_{1,n},y_{2,n},\ldots,y_{t,n})) \bmod m.$$

Then:

$$a^{y_1,y_2,\ldots,y_t} = \sum b^{y_1,y_2,\ldots,y_t}_{i_1,i_2,\ldots,i_l}$$

where $$b^{y_1,y_2,\ldots,y_t}_{i_1,i_2,\ldots,i_l} = \prod_{j=1}^{l} \delta(y_{1,i_j}, y_{2,i_j}, \ldots, y_{t,i_j}).$$

Each summand $b^{y_1,y_2,\ldots,y_t}_{i_1,i_2,\ldots,i_l}$ corresponds to a monomial of $\tilde{Q}$ and occurs with multiplicity $\tilde{a}_{i_1,i_2,\ldots,i_l}$ in the above sum.

It is easy to check that there exists partitions $\mathcal{P}_{i_1,i_2,\ldots,i_l}$ of $[0,n-1]^n$ such that for all $y_1, y_2, \ldots, y_t \in [0,n-1]^n$, $$b^{y_1,y_2,\ldots,y_t}_{i_1,i_2,\ldots,i_l} = \begin{cases} 1 & \text{if } y_1, y_2, \ldots, y_t \text{ belongs to the same block of } \mathcal{P}_{i_1,i_2,\ldots,i_l}, \\ 0 & \text{otherwise} \end{cases}.$$

A block in the partition $\mathcal{P}_{i_1,i_2,\ldots,i_l}$ covers $y \in [0,n-1]^n$ if $y$ is an element of the block.

A set system $\mathcal{G}$ is defined as follows: the sets in $\mathcal{G}$ correspond to $y$ for $y \in [0,n-1]^n$, and the set corresponding to $y$ has elements given by the blocks that cover $y$.

The set $y$ in the set system $\mathcal{G}$ has size equal to the number of blocks that cover $y$, which is equal to $$a^{y,y,\ldots,y} = \tilde{Q}(1,1,\ldots,1) \equiv 0 \bmod m.$$

For any $2 \leq t' \leq t$, and $y_1, y_2, \ldots, y_{t'} \in [0,n-1]^n$ distinct, some block of $\mathcal{P}_{i_1,i_2,\ldots,i_l}$ covers all of $y_1, y_2, \ldots, y_{t'}$ if and only if $b^{y_1,y_2,\ldots,y_{t'},\ldots,y_{t'}}_{i_1,i_2,\ldots,i_l} = 1$ (note that $y_{t'}$ occurs in the superscript $t - t' + 1$ times). So, the number of such blocks is equal to $$a^{y_1,y_2,\ldots,y_{t'},\ldots,y_{t'}} \not\equiv 0 \bmod m.$$

The following theorem can be proved by, letting $m = p_1^{\alpha_1} p_2^{\alpha_2} \cdots p_r^{\alpha_r}$ be a positive integer with $r > 1$ distinct prime divisors, and $l \geq 2$ be an integer such that $l < \min(p_1, p_2, \ldots, p_r)$. Then, for all integers $t \geq 2$ and $n \geq 1$, there exists an explicitly constructible set-system $\mathcal{H}$ which contains sets with exactly 2 different sizes, defined over a universe of $h$ elements, such that 1. 
$$h < 2l(m-1)n^{4mn^{\frac{1}{r}}} \text{ if } n \geq (4m)^{1+\frac{1}{r-1}},$$

2. $|\mathcal{H}| = n^{ln} + ln^n$,
3. $\forall H_1, H_2 \in \mathcal{H}$, either $|H_1| = |H_2| = l|H_2|$ or $l|H_1| = |H_2|$,
4. $\mathcal{H}$ has $t$-wise restricted intersections modulo $m$.

As noted above, there exists a uniform set-system $\mathcal{G}$ that satisfies Set Conditions 1-3 above which is defined over a universe of $g$ elements, such that $|\mathcal{G}| = n^n$. Furthermore, we know that $$g < \frac{2(m-1)n^{2d}}{d!}$$

provided the condition $n \geq 2d$ is satisfied.

As provided above, $d = \max(p_1^{e_1}, p_2^{e_2}, \ldots, p_r^{e_r}) - 1$ where $e_i$ is the smallest integer that satisfies $$p_i^{e_i} > \left\lceil n^{\frac{1}{r}} \right\rceil,$$

from which we obtain the inequality $$d < \max(p_1, p_2, \ldots, p_r)\left\lceil n^{\frac{1}{r}} \right\rceil < 2mn^{\frac{1}{r}}.$$

Hence if $$n \geq (4m)^{1+\frac{1}{r-1}},$$

then $n^{\frac{r-1}{r}} \geq 4mn \geq 4mn^{\frac{1}{r}} > 2d$, and thus we have $$g < \frac{2(m-1)n^{2d}}{d!} < 2(m-1)n^{2d} < 2(m-1)n^{4mn^{\frac{1}{r}}}.$$

Applying the Bounding Conditions with the above set system $\mathcal{G}$, we obtain a set system $\mathcal{H}$ satisfying (iii) and (iv). $\mathcal{H}$ has size $$|\mathcal{H}| = (n^n)^l + l(n^n) = n^{ln} + ln^n$$

and the number of elements in the universe of $\mathcal{H}$ is $$h = lg < 2l(m-1)n^{4mn^{\frac{1}{r}}}$$

provided that $$n \geq (4m)^{1+\frac{1}{r-1}}.$$

The layered secret sharing scheme described herein may utilize Trust Vectors. Trust Vectors may be mathematical constructs in which $m$, $h > 0$ are positive integers, $S \subseteq \mathbb{Z}_m \setminus \{0\}$, and $w(\cdot)$ and $\langle \cdot, \cdot \rangle$ denote Hamming weight and inner product, respectively. A subset $\mathcal{V} = \{v_i\}_{i=1}^{N}$ of vectors in $(\mathbb{Z}_m)^h$ forms an S-trust family of vectors if the following two conditions are satisfied:

$\forall i \in [N]$, it holds that: $\langle v_i, v_i \rangle = 0 \mod m$, $\forall i, j \in [N]$, where $i \neq j$, it holds that:

$$\langle v_i, v_j \rangle \mod m = \begin{cases} 0 & \text{if } w(v_i \circ v_j \mod m) = 0 \mod m \\ \in S & \text{otherwise} \end{cases},$$

where $\circ$ denotes a Hadamard/Schur product where for any two vectors $u, v \in \mathcal{R}^{11}$, their Hadamard/Schur product, is a vector in the same linear space whose i-th element is defined as: $(u \circ v)[i] = u[i] \cdot v[i]$, for all $i \in [n]$.

If each set $H_i \in \mathcal{H}$ is represented by a representative vector $v_i \in (\mathbb{Z}_m)^h$, then for the resulting subset $\mathcal{V}$ of vectors in $(\mathbb{Z}_m)^h$, the following result is provided. For the set-system $\mathcal{H}$, if each set $H_i \in \mathcal{H}$ is represented by a unique representative vector $v_i \in (\mathbb{Z}_m)^h$, then for a set S of size m−1, the set of vectors $\mathcal{V} = \{v_i\}_{i=1}^N$, formed by the representative vectors of all sets in $\mathcal{H}$, forms an S-trust family such that $$N > \exp\left(\frac{cl(\log h)^r}{(\log\log h)^{r-1}}\right) + l\exp\left(\frac{c(\log h)^r}{(\log\log h)^{r-1}}\right),$$

and $\forall i, j \in [N]$ it holds that $\langle v_i, v_j \rangle = |H_i \cap H_j| \pmod{m}$.

For such Trust Vectors, a k-multilinear form on Vector Families may be established. For example, let $\mathcal{V}$ be a vector family consisting of representative vectors for the sets in our set-system $\mathcal{H}$. We define a k-multilinear form on $\mathcal{V}^k$ by:

$$\langle w_1, w_2, \ldots, w_k \rangle_k = \sum_{i=1}^{h} w_{1,i} w_{2,i} \cdots w_{k,i}.$$

For any $v \in \mathcal{V}$, we will use the same symbol v to represent the corresponding set in $\mathcal{P}$. Let $u, v_1, v_2 \in \mathcal{V}$. Then $\langle u, v_1 \cup v_2 \rangle = |u \cap (v_1 \cup v_2)| = |(u \cap v_1) \cup (u \cap v_2)| =$ $|(u \cap v_1)| + |(u \cap v_2)| - |u \cap v_1 \cap v_2| = \langle u, v_1 \rangle + \langle u, v_2 \rangle - \langle u, v_1, v_2 \rangle_3$.

So, by defining F as:

$F(x, y, z) = x + y - z$, it follows that:

$F(\langle u, v_1 \rangle, \langle u, v_2 \rangle, \langle u, v_1, v_2 \rangle_3) = \langle u, v_1 \cup v_2 \rangle$.

Similarly, $\langle u, v_1, v_2 \cup v_3 \rangle_3 = |u \cap v_1 \cap (v_2 \cup v_3)| = |(u \cap v_1 \cap v_2) \cup (u \cap v_1 \cap v_3)| =$ $|(u \cap v_1 \cap v_2)| + |(u \cap v_1 \cap v_3)| - |u \cap v_1 \cap v_2 \cap v_3| =$ $\langle u, v_1, v_2 \rangle + \langle u, v_1, v_3 \rangle - \langle u, v_1, v_2, v_3 \rangle_4$.

Hence, it holds that:

$F(\langle u, v_1, v_2 \rangle_3, \langle u, v_1, v_3 \rangle_3, \langle u, v_1, v_2, v_3 \rangle_4) = \langle u, v_1, v_2 \cup v_3 \rangle_3$.

In similar fashion, one can compute:

$\langle u, v_1 \cup v_2 \cup \ldots \cup v_l \rangle$, if the values of the k-multilinear forms $\langle w_1, w_2, \ldots, w_k \rangle_k$ for all $k \leq l+1$ and for all $w_k \in \mathcal{V}$ are known.

Accordingly, one example of a first layered secret sharing scheme is described. Let $\mathcal{P} = \{P_1, \ldots, P_\ell\}$ be a set of $\ell$ polynomial-time parties. We begin by giving a procedure to generate the LWE modulus.

To generate the LWE modulus, for $\eta > \ell$, generate a set of distinct large primes, $\{p_1, p_2, \ldots, p_\eta\}$. In addition, a prime $q = \Pi_{i=1}^\eta p_i + 1$, where u is an integer is generated. Using Dirichlet's Theorem (for all coprime integers a and q, there are infinitely many primes, p, of the form $p = a \mod q$) it may be provided that there are infinitely many such primes q.

Layered identifiers may then be generated. Specifically, each party $P_i \in \mathcal{P}$ is assigned an identifier $x_i \in \mathbb{Z}_m$, where $m = \varphi(q)$, i.e., $m = \Pi_{i=1}^\eta p_i \cdot \Pi_{d \geq 1} \beta_d^{\alpha_d}$ for primes $\beta_i$ and positive integers $\alpha_i$. The layered identifier generation is initialized by each party $P_i \in \mathcal{P}$ generating a "trust set" $\Lambda_i$ and an "anti-trust set" $\overline{\Lambda}_i$, which contain the parties that it trusts and does not trust, respectively. The parties send their trust and anti-trust structures to a dealer, which computes:

$$\Omega = \bigcap_{i=1}^{\ell} \Lambda_i;$$

$$\Psi = \bigcap_{i=1}^{\ell} \overline{\Lambda}_i.$$

If $\Omega \subseteq \Psi$, then the dealer requests the parties to send refreshed versions of their trust and anti-trust structures. The dealer uses $\Omega$ and $\Psi$ to define a "cumulative trust structure" $\daleth$, which is a family of subsets defined as:

$\daleth = \mathcal{A} \supseteq \Omega \land \mathcal{A} \not\supseteq \Psi$.

The dealer defines a set-system modulo m, as defined above with parameters such that $l \geq n/2$. Depending on the cardinality of $\Omega$, the dealer picks an identifying set. In picking the identifying set, if $|\Omega| > n/2$ the dealer picks an identifying set $H \in \mathcal{H}$ such that H falls in a subclass described above in which H is a superset of exactly l sets and not a subset of any sets in $\mathcal{H}$. Otherwise, the dealer picks an identifying set $H \in \mathcal{H}$ such that H falls in a subclass described above in which H is a subset of exactly $s^{l-1}$ sets and not a superset of any sets in $\mathcal{H}$.

A family of representative trust vectors $\mathcal{V} \in (\mathbb{Z}_m)^h$ is defined for the set-system $\mathcal{H}$, and $v \in \mathcal{V}$ may be the trust vector that represents H. The trust identifiers for the parties are generated as follows.

For each party $P_i \in \Omega$, a unique vector $$v_i \xleftarrow{\$} V$$

is randomly selected such that, $\langle v, v_i \rangle \neq 0 \mod m$ (i.e., $H \not\subseteq H_i$ and $H_i \not\subseteq H$) and $v = \Sigma_{i \in \Omega} v_i \mod m$. The identifier for party $P_i$ may be computed as: $x_i = \langle v, v_i \rangle \mod m$. A party $P_k \in \Omega$, may be randomly picked whose identifier is $x_k (= \langle v, v_k \rangle \mod m) + 1$.

The family of sets which do not contain some element $\kappa \in H$ may be denoted as $\mathcal{H}_\kappa \subset \mathcal{H}$, A party may be randomly picked from $P_j \in \Psi \setminus \Omega$. For parties $P_z \in \mathcal{P} \setminus \{\Omega \cup P_j\}$, a unique set $H_z \in \mathcal{H}$, may be picked, which implies that $\langle v,v_z\rangle \neq 0$ mod m. The k-multilinear forms described above may be used to generate identifier $x_z=\langle v,v_z\rangle$ mod m for each party $P_z$. Because sets from $\mathcal{H}_K$ are used to generate identifiers $x_z$, it holds that $\cup_{i\in\mathcal{H}_K} H_i \not\subseteq H$ and $\cup_{i\in\mathcal{H}_K} H_i \not\supseteq H$.

For party $P_j$, a trust vector $v_j \in \mathcal{V}$ is randomly picked such that for the set $H_e$ represented by $y_e=\Sigma_{i\in\Psi}v_i+v$, it holds that: $H_e \in \mathcal{H}_K$. The identifier for $P_j$ becomes: $x_j=\langle v,v_j\rangle$ mod m. This ensures that if $\mathcal{B} \supseteq \Psi$ is a part of the collaborating subset $\mathcal{A}$, then $\Sigma_{i\in\mathcal{A}}x_i \neq 0$ mod m even when $\mathcal{A} \supset \Omega$.

With further details regarding the process of share generation, it is known that multilinear map schemes such as GGH15 allow parties to operate on "encoded" LWE secrets. To generate shares for the present layered secret sharing scheme, instead of allowing parties to encode their LWE secret matrices, only the dealer may be allowed to use an appropriate multilinear map $\mathcal{M}$ of its choice to generate encodings of the form $S^{x_i}$, where $x_i$ is the identifier of party $P_i \in \mathcal{P}$ and S is any random matrix/vector from the domain of $\mathcal{M}$, that the dealer wants to share. The dealer may send encoding $S^{x_i}$ to each party $P_i \in \mathcal{P}$. Multiliner map $\mathcal{M}$ may be defined in a restricted manner such that only multiplication is supported by it. The information $\lambda \in I$, that is needed to "invert" the map is shared among the parties such that $\lambda = f(\{I_i\}_{i\in U})$ for all $U \in \mathcal{T}$. Hence, no subset of parties $\mathcal{B} \notin \mathcal{T}$ can compute $\lambda \in I$. For instance, this can be done in GGH15 by simply providing random LWE matrices $A_i$ of desired dimensions to each party $P_i \in \Omega$ such that Hadamard product of the matrices $\{A_i\}_{i\in\Omega}=A_r$, where $P_r$ is the final party in the Directed Acyclic Graph (DAG) defined by $\Omega$. For each party $P_j \notin \mathcal{T}$, a random matrix $A_j^*$ is generated such that $A_j^* \circ A_r = A_j$ mod m. For the $P_e \in \Psi$, which comes after all $P_i \in \Psi$ in the DAG, generate a random matrix $A_t^*$ such that for all k, it holds that: $A_t^* \circ A_k \neq A_t$ mod m.

The process of secret reconstruction will now be discussed. Any subset of parties $\mathcal{A} \subseteq \mathcal{P}$ can multiply their "shares" to compute an LWE sealed version of:

$$t \bmod q = \prod_{i\in\mathcal{A}} S^{x_i} = S^{\Sigma_{i\in\mathcal{A}}x_i} \bmod q.$$

It is known that any $\mathcal{A} \in \mathcal{T}$ can compute $\lambda \in I$ and unseal t mod q by inverting $\mathcal{M}$. Hence, it follows from the layered identifier generation procedure and Euler's theorem that $\mathcal{A} \in \mathcal{T}$ can compute S from t mod q. Similarly, no unauthorized subset $\mathcal{B} \notin \mathcal{T}$ can compute the "inversion information" $\lambda \in I$ for $\mathcal{M}$. Hence, secrecy against unauthorized subsets follows from the security guarantees of $\mathcal{M}$; and ensures that $\mathcal{B}$ can only derive random matrices $R \neq S$. Because the intended parties are provided with the exact information to invert $\mathcal{M}$, the parties are able to compute exact value of S unlike the multilinear map schemes, where the parties can only "extract" $b \ll |S|$ most significant bits.

Figure 4:
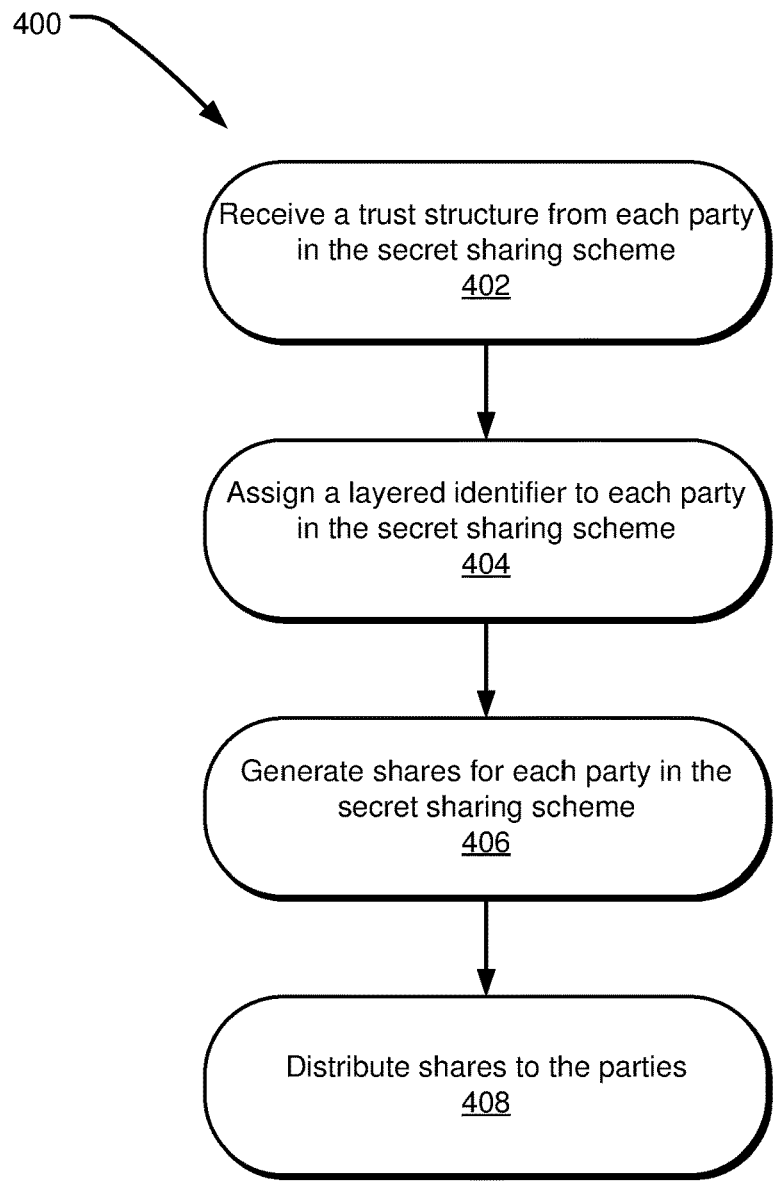
FIG. 4 illustrates example operations for generation of shares according to the present layered secret sharing scheme.

FIG. 4 illustrates example operations 400 for share generation in a layered secret sharing scheme. The operations 400 may include a receiving operation 402 in which trust and adversary structures are received from each party in the scheme.

The operations 400 also include an assigning operation 404 in which a layered identifier is assigned to each party as described above. The operations 400 may also include a generating operation 406 in which shares are generated that include encoded information regarding the trust and adversary structures that may be used to determine authorized subsets and adversary subsets for secret reconstruction. The shares are distributed to the parties in a distributing operation 408.

Figure 5:
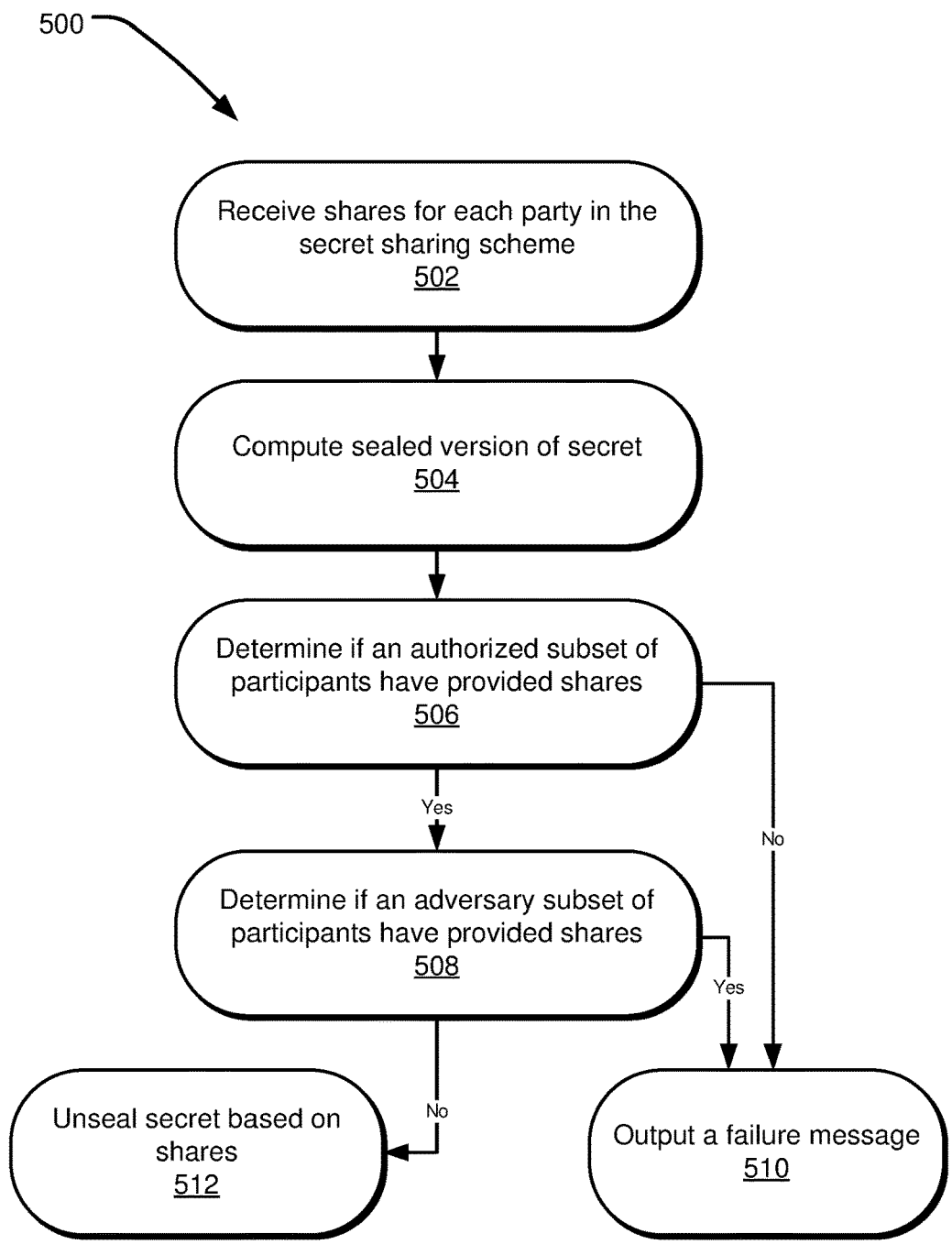
FIG. 5 illustrates example operation for reconstruction of a secret according to the present layered secret sharing scheme

FIG. 5 illustrates an example of operations 500 for secret reconstruction. The operations 500 include a receiving operation 502 in which the parties from the collaborating subset exchange their shares. The operations 500 include a computing operation 504 that, for example, multiplies the secrets to generate a sealed version of the secret.

In turn, a determining operation 506 may determine if an authorized subset of participating computing devices is present in the request to reconstruct the secret. If an authorize subset is not present, the reconstruction fails and an output operation 510 may output a failure message. However, if it is determined that an authorized subset is present, a further determining operation 508 determines if an adversary subset of participants is present. If an adversary subset of participants is present, the reconstruction fails and the outputting operation 510 outputs the failure message. If it is determined at the determining operation 508 that an adversary subset of participants is not present, then an unsealing operation 512 may unseal the secret computed in sealed form at the computing operation 504. In turn, the secret may be provided to the participating set of parties.

Figure 6:
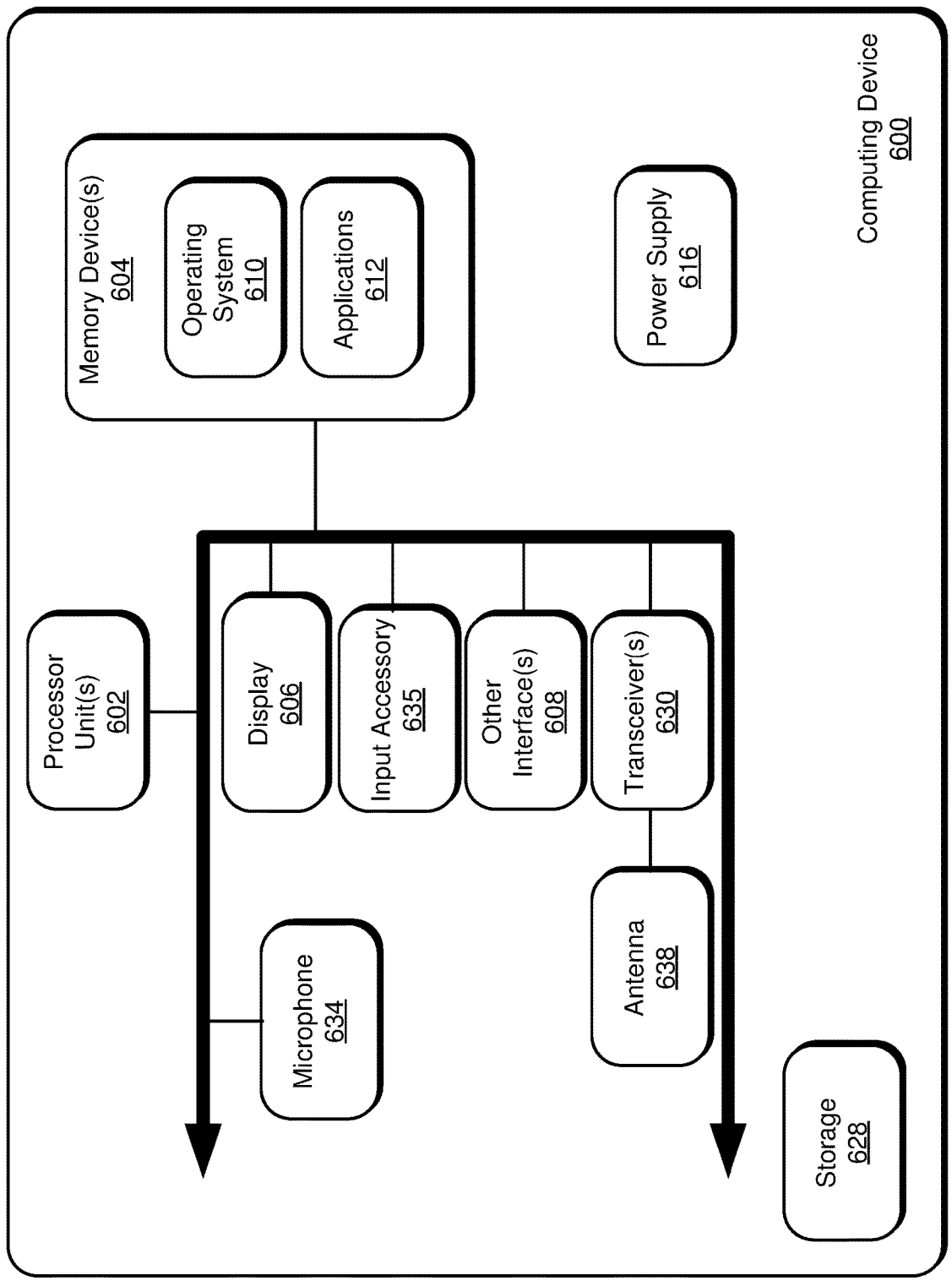
FIG. 6 illustrates an example of a computing device capable of providing functionality associated with the secret sharing scheme described herein.

As described above, a secret sharing scheme as described herein may be used by a plurality of computing devices for computational secret sharing of a secret comprising data in a memory device. FIG. 6 illustrates an example schematic of a computing device 600 suitable for implementing aspects of the disclosed technology including any of the foregoing computing devices utilized in a secret sharing scheme including a party, secret generator, and/or dealer as described above. The computing device 600 includes one or more processor unit(s) 602, memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Apple macOS operating system, or the Linux operating system, resides in the memory 604 and is executed by the processor unit(s) 602, although it should be understood that other operating systems may be employed.

One or more applications 612 are loaded in the memory 604 and executed on the operating system 610 by the processor unit(s) 602. Applications 612 may receive input from various input local devices such as a microphone 634, input accessory 635 (e.g., keypad, mouse, stylus, touchpad, joystick, instrument mounted input, or the like). Additionally, the applications 612 may receive input from one or more remote devices such as remotely-located smart devices by communicating with such devices over a wired or wireless network using more communication transceivers 630 and an antenna 638 to provide network connectivity (e.g., a mobile phone network, Wi-Fi®, Bluetooth®). The computing device 600 may also include various other components, such as a positioning system (e.g., a global positioning satellite transceiver), one or more accelerometers, one or more cameras, an audio interface (e.g., the microphone 634, an audio amplifier and speaker and/or audio jack), and storage devices 628. Other configurations may also be employed.

The computing device 600 further includes a power supply 616, which is powered by one or more batteries or other power sources and which provides power to other components of the computing device 600. The power supply

616 may also be connected to an external power source (not shown) that overrides or recharges the built-in batteries or other power sources.

In an example implementation, the computing device 600 comprises hardware and/or software embodied by instructions stored in the memory 604 and/or the storage devices 628 and processed by the processor unit(s) 602. The memory 604 may be the memory of a host device or of an accessory that couples to the host. Additionally or alternatively, the computing device 600 may comprise one or more field programmable gate arrays (FGPAs), application specific integrated circuits (ASIC), or other hardware/software/firmware capable of providing the functionality described herein.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable, and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for sharing a layered secret amongst a plurality of computing devices, comprising:
   distributing a share of the secret to a plurality of computing devices, wherein the secret is not reconstructable with less than all of the shares of the secret from an authorized subset of participants that comprise a subset of the plurality of computing devices;
   receiving a request to reconstruct the secret, wherein the request comprises the shares from a participating subset of the computing devices, and wherein each of the plurality of shares from the participating subset of the computing devices comprises an encoded trust and adversary structure related to reconstruction of the secret, wherein no information regarding the encoded trust and adversary structure of a given participant of the participating subset is available to other participants of the participating subset;
   defining an authorized subset of participants required to participate in the request for reconstruction of the secret, wherein the authorized subset is based on the encoded trust and adversary structure of the shares of the participating subset of the computing devices;
   defining an adversary subset of participants that will preclude reconstruction of the secret, wherein the adversary subset is based on the encoded trust and adversary structures of the shares of the participating subset of the computing devices;
   determining whether the participating subset of computing devices comprises the authorized subset of participants and whether the participating subset of computing devices comprises the adversary subset; and
   reconstructing the secret using the plurality of shares when the participating subset of the computing comprises the authorized subset and the participating subset of computing devices does not comprise the adversary subset.

2. The method of claim 1, further comprising:
   generating identifiers for each of the parties to which a share is distributed.

3. The method of claim 2, further comprising receiving from each party a respective encoded trust and adversary structure.

4. The method of claim 3, wherein the trust and adversary structure comprises a trust vector defining a trust family.

5. The method of claim 3, further comprising:
generating the shares based on the respective encoded trust and adversary structures of each party based on encoding the trust and adversary structures via a multilinear map.

6. The method of claim 1, wherein a result of either the participating subset not comprising the authorized subset or the participating subset comprising the adversary subset provides no information regarding what condition caused reconstruction failure.

7. The method of claim 1, wherein secret reconstruction comprises a sub-exponential polynomial-time calculation.

8. The method of claim 1, wherein the authorized subset and the adversary subset are generated by application of a non-linear function on the encoded trust and adversary structure of each party to define a unified trust structure for the scheme.

9. A computing device executable for implementing a layered secret sharing scheme, comprising:
a secret reconstruction module executed by a hardware processor of the computing device to:
receive a request to reconstruct the secret, wherein the request comprises shares of the secret from a participating subset of a plurality of computing devices, wherein each of the shares from the participating subset of the computing devices comprise an encoded unified trust structure that is generated based on a trust and adversary structure from each of the plurality of computing devices, and wherein no information regarding the encoded trust and adversary structure of a given participant of the participating subset is available to other participants of the participating subset,
define an authorized subset of participants that participate in the request for reconstruction of the secret, wherein the authorized subset is based on the encoded unified trust structure,
define an adversary subset of participants that will preclude reconstruction of the secret, wherein the adversary subset is based on the encoded unified trust structure,
determine whether the participating subset of computing devices comprises the authorized subset of participants and whether the participating subset of computing devices comprises the adversary subset, and
reconstruct the secret using the plurality of shares when the participating subset of the computing comprises the authorized subset and the participating subset of computing devices does not comprise the adversary subset.

10. The computing device of claim 9, further comprising:
a layered identifier generation module executable by the hardware processor of the computing device to generate a layered identifier for each of the plurality of computing devices of the secret sharing scheme.

11. The computing device of claim 10, further comprising:
a share generation module executable by the hardware processor of the computing device to:
receive a secret comprising secret data,
receive the encoded trust and adversary structure of each of the plurality of computing devices, and
generate the shares of the secret, wherein the secret is not reconstructable with less than the shares of an authorized set of participants that comprises a subset of the plurality of computing devices.

12. The computing device of claim 11, wherein the shares are generated based on the encoded trust and adversary structure of each party based on encoding the encoded trust and adversary structure into a multilinear map.

13. The computing device of claim 12, wherein the encoded trust and adversary structure comprises a trust vector.

14. The computing device of claim 9, wherein a result of either the participating subset not comprising the authorized set or the participating subset comprising the adversary set provides no information regarding what condition caused reconstruction failure.

15. The computing device of claim 9, wherein secret reconstruction comprises a sub-exponential polynomial-time calculation.

16. One or more tangible processor-readable storage media embodied with instructions for executing on one or more processors and circuits of a device a process for executing a layered secret sharing scheme amongst a plurality of computing devices, comprising:
distributing a share of the secret to a plurality of computing devices, wherein the secret is not reconstructable with less than all of the shares of the secret from an authorized subset of participants that comprise a subset of the plurality of computing devices;
receiving a request to reconstruct the secret, wherein the request comprises the shares from a participating subset of the computing devices, and wherein each of the plurality of shares from the participating subset of the computing devices comprises an encoded trust and adversary structure related to reconstruction of the secret, wherein no information regarding the encoded trust and adversary structure of a given participant of the participating subset is available to other participants of the participating subset;
defining an authorized subset of participants required to participate in the request for reconstruction of the secret, wherein the authorized set is based on the encoded trust and adversary structure of the shares of the participating subset of the computing devices;
defining an adversary subset of participants that will preclude reconstruction of the secret, wherein the adversary subset is based on the encoded trust and adversary structure of the shares of the participating subset of the computing devices;
determining whether the participating subset of computing devices comprises the authorized subset of participants and whether the participating subset of computing devices comprises the adversary subset; and
reconstructing the secret using the plurality of shares when the participating subset of the computing comprises the authorized subset and the participating subset of computing devices does not comprise the adversary subset.

17. The one or more tangible processor-readable storage media of claim 16, wherein the process further comprises:
generating identifiers for each of the parties to which a share is distributed.

18. The one or more tangible processor-readable storage media of claim 16, wherein the process further comprises:

generating the shares based on the encoded trust and adversary structure of each party based on encoding the encoded trust and adversary structure into a multilinear map.

19. The one or more tangible processor-readable storage media of claim 16, wherein a result of either the participating subset not comprising the authorized set or the participating subset comprising the adversary set provides no information regarding what condition caused reconstruction failure.

20. The one or more tangible processor-readable storage media of claim 16, wherein secret reconstruction comprises a sub-exponential polynomial-time calculation.

* * * * *